(12) United States Patent
Yamane et al.

(10) Patent No.: US 12,365,097 B2
(45) Date of Patent: Jul. 22, 2025

(54) LOADING ROBOT HAND, ROBOT, AND ARTICLE HOLDING METHOD

(71) Applicant: KAWASAKI JUKOGYO KABUSHIKI KAISHA, Kobe (JP)

(72) Inventors: Hideshi Yamane, Kobe (JP); Shoichi Miyao, Kobe (JP); Toshiyuki Tsujimori, Kobe (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 295 days.

(21) Appl. No.: 18/013,093

(22) PCT Filed: Jun. 24, 2021

(86) PCT No.: PCT/JP2021/024048
§ 371 (c)(1),
(2) Date: Dec. 27, 2022

(87) PCT Pub. No.: WO2021/261573
PCT Pub. Date: Dec. 30, 2021

(65) Prior Publication Data
US 2023/0249361 A1    Aug. 10, 2023

(30) Foreign Application Priority Data
Jun. 26, 2020 (JP) .................................. 2020-110432

(51) Int. Cl.
*B25J 15/00* (2006.01)
*B25J 9/16* (2006.01)
*B25J 13/08* (2006.01)

(52) U.S. Cl.
CPC ......... *B25J 15/0023* (2013.01); *B25J 9/1612* (2013.01); *B25J 13/088* (2013.01)

(58) Field of Classification Search
CPC ..... B25J 9/1612; B25J 13/088; B25J 15/0023
See application file for complete search history.

(56) References Cited

U.S. PATENT DOCUMENTS 4,680,523 A * 7/1987 Goumas ................. B25J 13/085
                                                  318/696
9,737,994 B2 * 8/2017 Ishikawa ................ B25J 15/103
(Continued)

FOREIGN PATENT DOCUMENTS

DE     3632151 A1 * 3/1988
JP    S60-242920 A   12/1985
(Continued)

OTHER PUBLICATIONS

Sep. 7, 2021 International Search Report issued in Patent Application No. PCT/JP2021/024048.

*Primary Examiner* — Saul Rodriguez
*Assistant Examiner* — Brendan P Tighe
(74) *Attorney, Agent, or Firm* — Oliff PLC

(57) ABSTRACT

A loading robot hand includes a first member, a second member, and a drive unit. The second member can hold an article between the first member and the second member. The drive unit moves the second member in a direction toward and away from the first member. The drive unit includes a moving base, a fluid cylinder, a pressure regulator, and a controller. The moving base is slidably movable by driving a drive source. The fluid cylinder is attached to the moving base. The pressure regulator can change operating pressure of the fluid cylinder. The controller controls the pressure regulator. A direction of expansion and contraction of the fluid cylinder is parallel to a direction of slide movement of the moving base. The second member is attached to a portion of the fluid cylinder that is movable relative to the moving base.

5 Claims, 4 Drawing Sheets

(56) References Cited

U.S. PATENT DOCUMENTS

| | | | | |
|---|---|---|---|---|
| 10,647,006 B2 * | 5/2020 | Matsumoto | .............. | B25J 15/08 |
| 2023/0142488 A1 * | 5/2023 | Wei | ........................ | B65G 47/90 |
| | | | | 414/751.1 |
| 2024/0408771 A1 * | 12/2024 | Azad | ........................ | B25J 9/126 |

FOREIGN PATENT DOCUMENTS

| JP | H05-305593 A | | 11/1993 |
|---|---|---|---|
| JP | H06210584 A | * | 8/1994 |
| JP | H0780144 B2 | * | 8/1995 |
| JP | H07290391 A | * | 11/1995 |
| JP | 2010-214543 A | | 9/2010 |
| JP | 2011-051081 A | | 3/2011 |
| JP | 5112115 B2 | | 1/2013 |

\* cited by examiner (a)

(b)

(c)

LOADING ROBOT HAND, ROBOT, AND ARTICLE HOLDING METHOD

TECHNICAL FIELD

This invention relates primarily to a robot hand attached to a robot for performing loading operations.

BACKGROUND ART

A robot hand of this type is disclosed, for example, in PTL 1. In PTL 1, a robot hand provided with a robot palletizer includes a base body. The base body includes a fixed holding body and a movable holding body. The article is held from both sides by the fixed holding body and the movable holding body. A cylinder for the holding body, such as an air cylinder, is installed between the movable holding body and the base body.

PRIOR-ART DOCUMENTS

Patent Documents

PTL 1: Japanese Patent No. 5112115

SUMMARY OF THE INVENTION

Problems to be Solved by the Invention

In the configuration of the above-mentioned PTL 1, a cylinder for a holding body becomes larger when a moving stroke of a movable holding body is increased in order to hold various sizes of articles. Therefore, compactness is difficult to achieve. Furthermore, when one robot hand loads various articles of different hardness, if holding force by a cylinder is fixed, there is a risk of crushing soft articles.

The present invention is made in view of the circumstances, and an object of the present invention is to provide a loading robot hand that can load various articles without damaging them and can easily downsize a cylinder.

Means for Solving the Problems

The problem to be solved by the invention is as described above, and next, means for solving the problem and effects will be described.

In a first aspect of the present invention, a loading robot hand having the following configuration is provided. That is, the loading robot hand includes a first member, a second member, and a drive unit. The second member can hold an article between the first member and the second member. The drive unit moves the second member in a direction toward and away from the first member. The drive unit has a moving base, a fluid cylinder, a pressure regulator, and a controller. The moving base is slidably movable by driving the drive source. The fluid cylinder is attached to the moving base. The pressure regulator can change operating pressure of the fluid cylinder. The controller controls the pressure regulator. A direction of expansion and contraction of the fluid cylinder is parallel to a direction of slide movement of the moving base. The second member is attached to a portion of the fluid cylinder that is movable relative to the moving base.

This allows the force with which the second member presses the article to be easily changed by the pressure regulator according to hardness of the article. In addition, dimensional errors of the article can be easily absorbed by a stroke of the fluid cylinder. Thus, loading a variety of articles can be smooth and avoid damages to the articles while flexibly handling a variety of articles.

In a second aspect of the present invention, the following article holding method by a loading robot hand is provided. The loading robot hand includes a first member, a second member, and a drive unit. The second member can hold an article between the first member and the second member. The drive unit moves the second member in a direction toward and away from the first member. The drive unit includes a moving base, a fluid cylinder, a pressure regulator, and a controller. The moving base is slidably movable by driving a drive source. The fluid cylinder is attached to the moving base. The pressure regulator can change operating pressure of the fluid cylinder. The controller controls the servomotor and the pressure regulator. The article holding method includes a first process and a second process. In the first process, the second member is moved closer to the first member for only a portion of a stroke of moving the second member in order to bring the article to be held between the second member and the first member. In the second process, the second member is moved closer to the first member for the remainder of the stroke. The movement of the second member in the first process is performed by driving the drive source. The movement of the second member in the second process is performed by driving the fluid cylinder.

This allows the position of the second member to be roughly defined according to the size of the article in the first process. Thus, the article can be actually held in the second process. The dimensional errors of the article can be properly absorbed by the stroke of the fluid cylinder driven in the second process. Adjusting pressing force of the second member by the fluid cylinder with the pressure regulator allows even soft articles to be held appropriately.

Effects of the Invention

The present invention can provide a loading robot hand that can load various articles without damaging them and can easily downsize a cylinder.

EMBODIMENT FOR CARRYING OUT THE INVENTION

Figure 1:
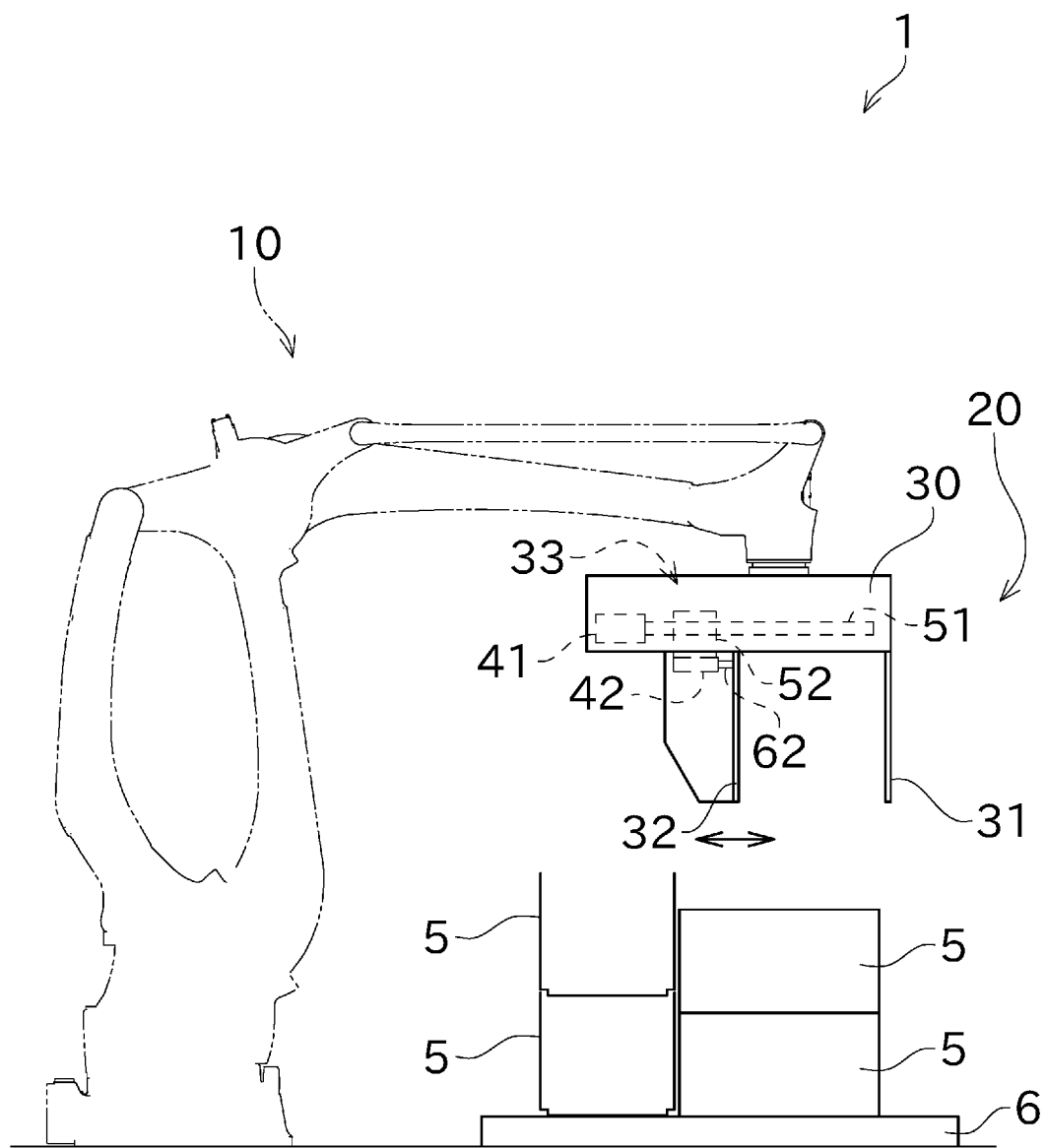
FIG. 1 is a schematic diagram of an overall configuration of a palletizing robot including a robot hand according to one embodiment of the present invention.
Figure 2:
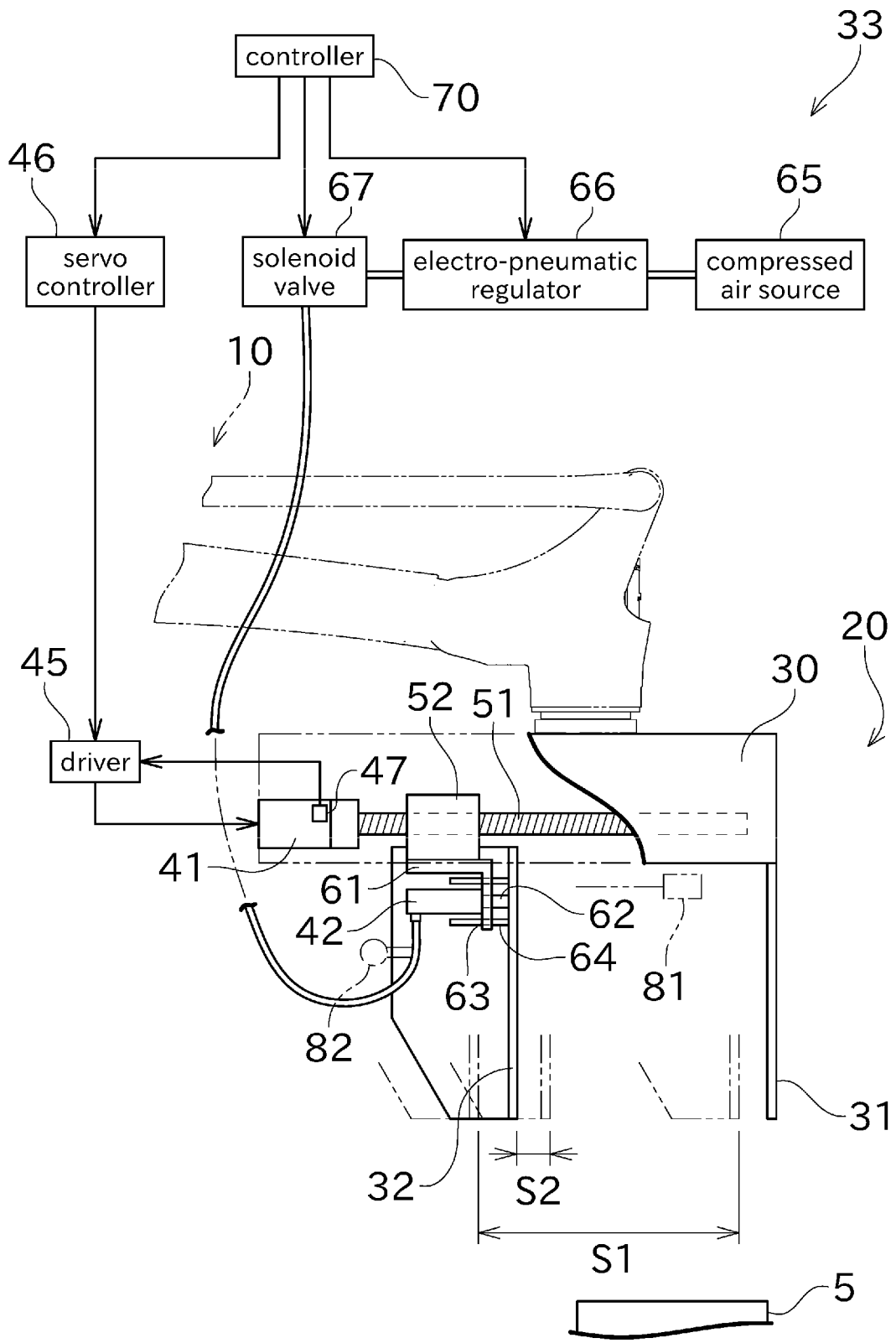
FIG. 2 is a schematic and block diagram showing the robot hand.

Next, the embodiments of the present invention will be described with reference to the drawings. FIG. 1 is a schematic diagram showing an overall configuration of a palletizing robot 1 including a robot hand 20 in accordance with one embodiment of the present invention. FIG. 2 is a schematic and block diagram showing the robot hand 20.

The palletizing robot (robot) 1 shown in FIG. 1 can arrange articles 5, such as food, beverages, etc., from a conveyor (not shown) onto a pallet 6. The palletizing robot 1 may be used to move the articles 5 lined up on the pallet 6 to the conveyor.

The palletizing robot 1 includes a robot body 10 and the robot hand 20.

The robot body 10 is configured as a known vertical articulated robot. The degrees of freedom of the robot can be 4 or 6, but are not limited to.

The robot hand 20 is fixed to the end of the robot body 10. Due to the various movement of the arm by robot body 10, the robot hand 20 can move and change direction in various directions.

The robot hand 20 has a base frame (base member) 30, a fixed plate (first member) 31, a moving plate (second member) 32, and a drive unit 33.

The base frame 30 is located at the top of the robot hand 20. The base frame 30 is configured in the form of a frame-body. A servo motor (drive source) 41 and a pneumatic cylinder (fluid cylinder) 42, which constitute the drive unit 33, are located in the base frame 30.

The fixed plate 31 is fixed to the edge of the base frame 30. The fixed plate 31 is located to extend downward from the base frame 30. The fixed plate 31 is horizontally opposite the moving plate 32. The surface of the fixed plate 31 facing the moving plate 32 can contact the article 5 to be transported.

The moving plate 32, in the same way as the fixed plate 31, is located to extend downward from the base frame 30. The moving plate 32 is supported in a slidable manner along a guide member (e.g., a rail) which is fixed to the base frame 30 and is not shown in the figure. The moving plate 32 is facing parallel to the fixed plate 31. A movement direction of the moving plate 32 is parallel to a thickness direction of the fixed plate 31 and parallel to a thickness direction of the moving plate 32. The surface of the moving plate 32 facing the fixed plate 31 can contact the article to be transported.

In the robot hand 20, the lower side of the space between the fixed plate 31 and the moving plate 32 is open. The robot hand 20 is lowered, so that the moving plate 32 moves closer to the fixed plate 32 with the article 5 inserted relative to the space from bottom to top. Thus, the article 5 can be held between the fixed plate 31 and the moving plate 32.

The drive unit 33 includes a servo motor 41 and a pneumatic cylinder 42.

The servo motor 41 is configured as a servo motor with a reduction gear. A screw shaft 51 is connected to the output shaft of the reduction gear. A slide member (moving base) 52 is screw-coupled to the screw shaft 51. The slide member 52 moves slidingly in conjunction with the rotation of the screw shaft 51. Thus, the servomotor 41 serves as a drive source to move the slide member 52.

The servo motor 41 includes a driver 45 and a servo controller 46 as shown in FIG. 2. The driver 45 is electrically connected to the servo motor 41. The servo controller 46 is configured as a known programmable controller (PLC) and is electrically connected to the driver 45.

The servo controller 46 outputs a command signal to the driver 45. The servo motor 41 is provided with an encoder 47, which detects a rotation angle of the output shaft of the servo motor 41. The encoder 47 outputs a signal representing the detected rotation angle to the driver 45. The driver 45 compares the command signal input from the servo controller 46 with the rotation angle input from encoder 47 so that the servo motor 41 is controlled to reduce the error to zero (feedback control).

As shown in FIG. 2, the pneumatic cylinder 42 is attached to the slide member 52 via bracket 61. The pneumatic cylinder 42 is located so that its expansion and contraction direction is parallel to a direction of movement of the slide member 52.

The end of a cylinder rod 62 provided with the pneumatic cylinder 42 is fixed to the moving plate 32. A plurality of guide holes 63 are provided in the bracket 61, and a bar-shaped guide rod 64 fixed to the moving plate 32 passes through each of the guide holes 63. This allows the movement direction of the moving plate 32 with respect to the slide member 52 to be guided.

A movement stroke S2 of the moving plate 32 caused by the expansion and contraction of the cylinder rod 62 is shorter than a movement stroke S1 of the moving plate 32 caused by the rotation of the servomotor 41 (S2<S1).

A compressed air source 65 is installed in the plant to supply air to the pneumatic cylinder 42. An electro-pneumatic regulator (pressure regulator) 66 and a solenoid valve 67 are located between the compressed air source 65 and the pneumatic cylinder 42.

The electro-pneumatic regulator 66 is a kind of proportional control valve, which can control the air pressure according to an input signal.

The solenoid valve 67 is located between the electro-pneumatic regulator 66 and the pneumatic cylinder 42. The solenoid valve 67 can switch between open and closed according to an input signal.

The robot hand 20 includes a controller 70 comprising a known computer. The controller 70 is electrically connected to the electro-pneumatic regulator 66, the solenoid valve 67, and the servo controller 46, respectively.

The controller 70 stores in advance rotational positions of the servo motor 41 (in other words, positions of the slide member 52) and pressure command values to the electro-pneumatic regulator 66 in the case of holding the article 5.

In this embodiment, the drive unit 33 for driving the moving plate 32 includes the servo motor 41, the driver 45, the servo controller 46, the slide member 52, the pneumatic cylinder 42, the electro-pneumatic regulator 66, the solenoid valve 67, and the controller 70.

Figure 3:
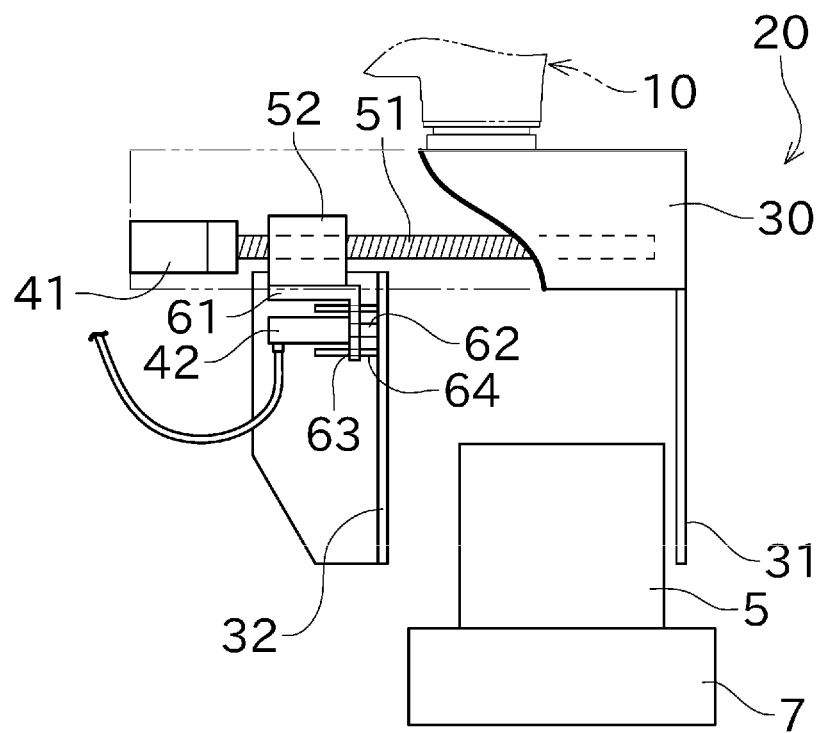
FIG. 3 is a diagram showing the operation of holding an article by driving a servo motor and a pneumatic cylinder.
Figure 3:
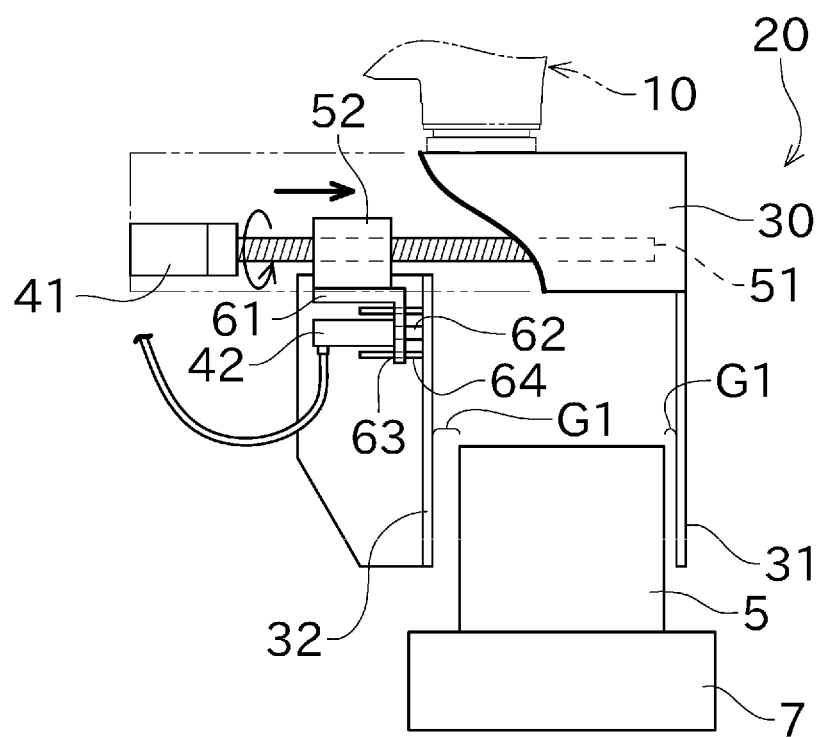
Figure 4:
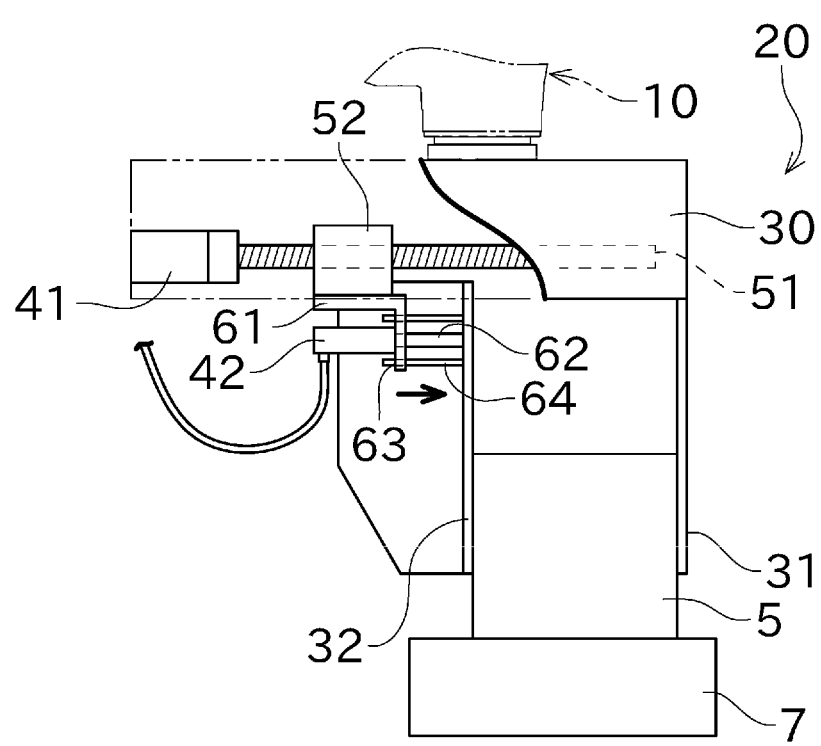
FIG. 4 is a diagram showing a state in which an article is held by the robot hand.

Next, control of the robot hand 20 in the case of holding the article 5 will be described with reference to FIG. 3 and FIG. 4.

In the state shown in FIG. 3(a), when the robot hand 20 holds the article 5 on a conveyor 7, the controller 70 controls the servo motor 41 so that the rotational position is set according to the size of the article 5. The rotation of the servomotor 41 moves the slide member 52, so that the moving plate 32 moves closer to the fixed plate 31 as shown in FIG. 3(b) (first process). At this time, the cylinder rod 62 of the pneumatic cylinder 42 is maintained in the evacuated position.

In the state shown in FIG. 3(b), where the first process is completed, the servo motor 41 is controlled so that the distance between the fixed plate 31 and the moving plate 32 is slightly larger than the horizontal dimension of the article 5. Therefore, simply driving the servo motor 41 does not allow the article 5 to be held by the fixed plate 31 and the moving plate 32.

After the first process is completed, a small gap G1 occurs between the fixed plate 31 and the article 5, or between the moving plate 32 and the article 5. The total size of the gap G1 varies depending on the dimensional errors of the article 5, however, it is large enough to be absorbed within the stroke S2 caused by the expansion and contraction of the pneumatic cylinder 42.

The controller 70 then opens the solenoid valve 67. Accordingly, compressed air is supplied to the pneumatic cylinder 42, which advances the cylinder rod 62. As a result, the moving plate 32 moves even closer to the fixed plate 31 (second process). Finally, the gap G1 described above disappears, and as shown in FIG. 4(c), the fixed plate 31 and the moving plate 32 hold the article 5 in a sandwiched state.

Thus, the stroke in which the moving plate 32 moves in the direction of approaching the fixed plate 31 to achieve the holding state of the article 5 is partly driven by the servo motor 41, and the rest is driven by the pneumatic cylinder 42.

Before switching the solenoid valve 67, the controller 70 outputs a pressure command value to the electro-pneumatic regulator 66. Accordingly, the force with which the moving plate 32 presses the article 5 as the cylinder rod 62 advances is a magnitude depending on the pressure command value.

When multiple types of articles 5 are loaded together on a single pallet, it is assumed that the size, weight and hardness of the articles 5 will vary variously. Controlling the electro-pneumatic regulator 66 so that the pneumatic cylinder 42 presses the moving plate 32 against the article 5 at pressure taking into account the hardness of the article 5 can achieve a smooth palletizing operation while handling variations in the article 5.

It is theoretically possible to hold the article 5 using only the servo motor 41 without the pneumatic cylinder 42. However, since the actual article 5 has dimensional errors, it is difficult to adjust the force with which the moving plate 32 presses the article appropriately by controlling the position of the servo motor 41. In this respect, in this embodiment, even if there is a slight dimensional error in the article 5, as long as the error is included within the expansion/contraction stroke of the pneumatic cylinder 42, the moving plate 32 can be stably pressed against the article 5. The pressing force at this time can also be set according to the article 5 by the pressure adjustment via the electro-pneumatic regulator 66.

The configuration of the present embodiment can reduce the stroke of the pneumatic cylinder 42 compared to the configuration of holding an article with a pneumatic cylinder (without a servomotor) described in PTL 1. Thus, it is easy to downsize and reduce the weight of the pneumatic cylinder 42 while allowing flexibly holding of articles 5 of various sizes.

When loading the same type of articles 5 in succession, driving of the servo motor 41 can be omitted. That is, the servo motor 41 is driven to determine the position of the slide member 52, taking into account the dimensions of the article 5, only at the first loading. For the second and subsequent loading, the holding/unholding of the article can be switched by simply moving the moving plate 32 with a small stroke caused by the expansion and contraction of the pneumatic cylinder 42. This can improve the efficiency of the loading operation.

Next, two modifications will be described.

As shown in FIG. 2 by the chain line, the robot hand 20 can be modified to include a position sensor 81 that can detect the position of the moving plate 32. Potentiometers, distance meters, and other known sensors can be adopted as the position sensor 81. The position sensor 81 is electrically connected to the controller 70.

A case is considered where, when compressed air is supplied to the pneumatic cylinder 42 in order to hold the article 5 in the robot hand 20, for some reason, the extension of the pneumatic cylinder 42 is not performed (or is not extended enough distance). In this case, the controller 70, which detected an abnormality in the position of the moving plate 32 by the position sensor 81, drives the servomotor 41 exceptionally to move the moving plate 32 to the normal position (in other words, to a position where the fixed plate 31 and the moving plate 32 can hold the article 5). This avoids a failure to hold the article 5.

As shown in FIG. 2 by the chain line, the robot hand 20 can be modified to include a pressure sensor 82. The pressure sensor 82 can detect pressure in a cylinder chamber of the pneumatic cylinder 42 on the side where compressed air is supplied to extend the pneumatic cylinder 42. The pressure sensor 82 is electrically connected to the controller 70.

The controller 70 controls the servo motor 41 according to the pressure detected by the pressure sensor 82. For example, if the pressure detected by the pressure sensor 82 exceeds a predetermined threshold value, the controller 70 controls the servo motor 41 to move the slide member 52 in the direction to loosen the pressing force of the slide member 32 on the article 5. On the other hand, when the detected pressure is below the predetermined threshold value, the controller controls the servo motor to move the slide member 52 in the direction to increase the pressing force of the moving plate 32 on the article 5. This enables adjustment of the pressing force by the servomotor 41.

In the above two modifications, the servo motor 41 is controlled according to the detection signal of the position sensor 81 or the pressure sensor 82. Instead of or in addition to this, control of the electro-pneumatic regulator 66 may be performed.

As described above, the robot hand 20 of the present embodiment includes the fixed plate 31, the moving plate 32, and the drive unit 33. The moving plate 32 can hold the article 5 between the fixed plate 31 and the moving plate 32. The drive unit 33 moves the moving plate 32 in the direction toward and away from the fixed plate 31. The drive unit 33 includes the slide member 52, the pneumatic cylinder 42, the electro-pneumatic regulator 66, and the controller 70. The slide member 52 is slidably movable by driving the servo motor 41. The pneumatic cylinder 42 is attached to slide member 52. The electro-pneumatic regulator 66 can change operating pressure of the pneumatic cylinder 42. The controller 70 controls the electro-pneumatic regulator 66. A direction of expansion and contraction of the pneumatic cylinder 42 is parallel to a direction of slide movement of the slide member 52. The moving plate 32 is attached to the cylinder rod 62, which is a portion of the pneumatic cylinder 42 that is movable relative to the slide member 52.

This allows the force with which the moving plate 32 presses the article 5 to be easily changed by the electro-pneumatic regulator 66 according to the hardness of the article 5. In addition, dimensional errors of the article 5 can be easily absorbed by the stroke of the pneumatic cylinder 42. Thus, loading a variety of articles 5 can be smooth and avoid damages to the articles 5 while flexibly handling a variety of articles.

In the robot hand 20 of the present embodiment, the drive source for moving the slide member 52 is the servo motor 41.

The combination of the servo motor 41 and the pneumatic cylinder 42 allows for an overall compact configuration.

The robot hand 20 of the present embodiment can be modified to include the position sensor 81 that can detect the position of the moving plate 32. In this case, the controller 70 controls at least any of the servo motor 41 and the electro-pneumatic regulator 66 depending on a detection result of the position sensor 81.

This allows, for example, the servo motor 41 to be used to hold the article 5 when the pneumatic cylinder 42 does not operate properly. Alternatively, this enables adjustment of the pressing force according to the position of the moving plate 32.

The robot hand 20 of the present embodiment can also be modified to include the pressure sensor 82 that can detect pressure of the cylinder chamber of the pneumatic cylinder 42. In this case, the controller 70 controls at least any of the servomotor 41 and the electro-pneumatic regulator 66 depending on a detection result of the pressure sensor 82.

Thus, the force, etc., with which the moving plate 32 presses the article 5 can be adjusted with reference to the detected pressure.

The palletizing robot 1 of the present embodiment includes the robot hand 20.

This can provide a robot that is suitable for loading a large variety of articles 5.

While some preferred embodiments of the present invention have been described above, the above-described configuration may be modified, for example, as follows.

The driver 45, the servo controller 46, the electro-pneumatic regulator 66, the solenoid valve 67, and the controller 70 may be incorporated in the robot hand 20 or may be located outside of the robot hand 20.

A hydraulic cylinder may be used as the fluid cylinder. However, using a pneumatic cylinder 42, as in the above embodiment, is preferable because the springiness of air can be utilized to press the article 5 with the moving plate 32.

Instead of attaching the cylinder side of the pneumatic cylinder 42 to the bracket 61, the cylinder rod side may be attached to the bracket 61. In this case, the cylinder side of the pneumatic cylinder 42 would be fixed to the moving plate 32.

The bracket 61 may be omitted and the pneumatic cylinder 42 may be fixed directly to the slide member 52 that moves with the screw.

DESCRIPTION OF THE REFERENCE NUMERALS 1 palletizing robot (robot)
5 article
20 robot hand (loading robot hand)
31 fixed plate (first member)
32 moving plate (second member)
33 drive unit
41 servo motor (drive source)
42 pneumatic cylinder (fluid cylinder)
52 slide member (moving base)
66 electro-pneumatic regulator (pressure regulator)
70 controller
81 position sensor
82 pressure sensor

The invention claimed is:

1. A loading robot hand comprising:
a first member;
a second member capable of holding an article between the first member and the second member;
a position sensor capable of detecting a position of the second member; and
a drive unit that moves the second member toward and away from the first member, wherein:
the drive unit includes:
a drive source;
a slidable moving base driven by the drive source;
a fluid cylinder that is distinct from the drive source and is attached to the moving base;
a pressure regulator capable of changing operating pressure of the fluid cylinder; and
a controller that controls the drive source and the pressure regulator;
the controller controls at least one of the drive source and the pressure regulator depending on a detection result of the position sensor; and
the controller is configured to cause the drive unit to perform a stroke in which the second member is moved closer to the first member by
(i) when the detection result indicates that a gap between one of the first and second members and the article is a first distance, executing a first process in which, of the drive source and the fluid cylinder, only the drive source is driven to move the moving base, the fluid cylinder, and the second member for a portion of the stroke, and
(ii) when the detection result indicates that the gap is a second distance less than the first distance, then executing a second process in which the operating pressure of the fluid cylinder is changed so as to move the portion of the fluid cylinder that is movable relative to the moving base and thereby move the second member, which is not yet in contact with the article, closer to the first member for a remainder of the stroke so that the gap disappears.

2. The loading robot hand according to claim 1, wherein the drive source is a servo motor.

3. The loading robot hand according to claim 1, further comprising:
a pressure sensor capable of detecting pressure of a cylinder chamber of the fluid cylinder, wherein
the controller controls at least one of the drive source and the pressure regulator depending on a detection result of the pressure sensor.

4. A robot comprising the loading robot hand according to claim 1.

5. An article holding method by a loading robot hand, the loading robot hand comprising:
a first member;
a second member capable of holding an article between the first member and the second member;
a position sensor capable of detecting a position of the second member; and
a drive unit that moves the second member toward and away from the first member, wherein:
the drive unit includes:
a drive source;
a slidable moving base driven by the drive source;
a fluid cylinder that is distinct from the drive source and is attached to the moving base;
a pressure regulator capable of changing operating pressure of the fluid cylinder; and
a controller that controls the drive source and the pressure regulator; and
the controller controls at least one of the drive source and the pressure regulator depending on a detection result of the position sensor, and
the article holding method comprising performing a stroke in which the second member is moved closer to the first member by
(i) when the detection result indicates that a gap between one of the first and second members and the article is a first distance, executing a first process of driving, of the drive source and the fluid cylinder, only the drive source to move the moving base, the fluid cylinder, and the second member for a portion of the stroke, and
(ii) when the detection result indicates that the gap is a second distance less than the first distance, then executing a second process of changing the operating pressure of the fluid cylinder so as to move the portion of the fluid cylinder that is movable relative to the moving base and thereby move the second member, which is not yet in contact with the article, closer to the first member for a remainder of the stroke so that the gap disappears.

* * * * *